US008187399B2

(12) United States Patent
Biernat et al.

(10) Patent No.: US 8,187,399 B2
(45) **Date of Patent: *May 29, 2012**

(54) ROTARY WAX TRANSFER DECORATING SYSTEM

(75) Inventors: Krzysztof P. Biernat, Lancaster, NY (US); David B. Vaughn, N. Tonawanda, NY (US)

(73) Assignee: Illinois Tool Works Inc., Gelnview, IL (US)

( * ) Notice: Subject to any disclaimer, the term of this patent is extended or adjusted under 35 U.S.C. 154(b) by 168 days.

This patent is subject to a terminal disclaimer.

(21) Appl. No.: 12/371,811

(22) Filed: Feb. 16, 2009

(65) Prior Publication Data

US 2009/0266470 A1 Oct. 29, 2009

Related U.S. Application Data

(60) Provisional application No. 61/048,439, filed on Apr. 28, 2008.

(51) Int. Cl.
*B32B 41/00* (2006.01)

(52) U.S. Cl. .......... 156/64; 156/360; 156/361; 156/366; 156/367; 156/368

(58) Field of Classification Search .................... 156/64, 156/360, 361, 366, 367, 368
See application file for complete search history.

(56) References Cited

U.S. PATENT DOCUMENTS

| | | | | |
|---|---|---|---|---|
| 4,253,904 | A * | 3/1981 | Jodrey et al. | 156/497 |
| 5,188,696 | A | 2/1993 | Good | |
| 5,259,913 | A * | 11/1993 | Stover | 156/566 |
| 5,306,375 | A | 4/1994 | Leonard | |
| 5,565,055 | A | 10/1996 | Croci | |
| 5,650,037 | A * | 7/1997 | Larson | 156/540 |
| 6,199,614 | B1 | 3/2001 | Snyder et al. | |
| 2003/0034111 | A1* | 2/2003 | Oldenburg et al. | 156/64 |
| 2006/0113020 | A1* | 6/2006 | Giacomazzi et al. | 156/64 |
| 2007/0209753 | A1* | 9/2007 | Gonzalez et al. | 156/212 |

FOREIGN PATENT DOCUMENTS

| | | |
|---|---|---|
| WO | 97/13645 | 4/1997 |
| WO | 2007/103002 | 9/2007 |

OTHER PUBLICATIONS

International Search Report for PCT/US3009/036746 dated Jun. 19, 2009.

* cited by examiner

*Primary Examiner* — George Koch
(74) *Attorney, Agent, or Firm* — Levenfield Pearlstein, LLC

(57) ABSTRACT

A label applicator system transfers labels from a web to items moving on a rotary item transport. The applicator system includes a supply for supplying the web with the labels thereon and a take-up for taking up the web after transfer of the label from the web to the item. The supply and take-up are vertically oriented. The applicator includes a movable label applicator head. A rotary table moves the items along a path defined by rotation of the table and rotates the items relative to an axis of the items. The label applicator head is movable toward and away from the item and the item is rotated to apply the label to the item as it moves passed the applicator head.

4 Claims, 5 Drawing Sheets

ROTARY WAX TRANSFER DECORATING SYSTEM

BACKGROUND OF THE INVENTION

The present invention relates to a decorating or graphic transfer system. More particularly, the present invention pertains to a high speed decorating system for label or graphic transfer that accommodates transfer to non-linear surfaces and accommodates differences in pitch between the graphic and the receiving surface.

Containers, and particularly bottles, are often decorated with indicia, logos and the like, as well as information such as food stuffs ingredients and nutritional information. The decoration can be provided as a label that is, for example, glued or adhered to the bottle, or as printing applied directly to the bottle.

As to labeling the bottles, this can be done in a number of ways. For example, adhesives can be used to adhere the label (e.g., pressure sensitive labels) directly to the bottle, such as a film-like wrap around label commonly used on 2 liter soda-pop bottles. Other methods include adhering a full, sleeve-like label both to itself and to the bottle. Another method includes wax transfer labels, in which a label is transferred from a web having a wax release layer. The wax transfer labels provide the least degradation over time. In addition, unlike pressure sensitive labels, the wax transfer label does not have to be removed prior to recycling, which is a consideration that is of increasing importance.

Label applicator machines for transferring labels from the carrier web to the bottles have become complex. Due to the increasing demand on manufacturing efficiencies and the attendant costs, many such machines are designed to provide increased throughput with lower labor costs. In addition, in order to meet such demands, not only the complexity, but the overall size of the machines has increased.

In order to apply labels to circular cross-section bottles, it is necessary to inflate the bottle (to provide a rigid surface against which to apply the label), and to rotate the bottle for proper label application. This further increases the complexity and size of the overall machine.

Accordingly, there is a need for a high speed wax transfer decorating system for applying labels to circular cross-section bottles. Desirably, such as system adjusts label web speed to properly apply the label to the bottle.

BRIEF SUMMARY OF THE INVENTION

A label applicator system provides for high speed, accurate label transfer from a web to items moving on a rotary dial (table) transport.

The items, typically circular cross-section bottles, can be of various heights and diameters are presented continuously on a rotary dial table to a label applicator head. The head applies a graphic label by application of heat and pressure to the cylindrical container face. The labels are released from a paper carrier by pre-heating the web as it approaches the applicator head.

The applicator head consists of a silicone rubber roller heated to a temperature that will release the label from the carrier. A present roller is heated to approximately 250 degrees F. The web is advanced by servo motors to accurately position the label as it is applied to the bottle. Web speed is synchronized to the bottle surface speed during the application of the label. The container is not indexed for decoration, rather it is decorated on the fly as it passes the application point.

Two servos move the container, one for rotation/orientation during decoration, the other for movement of the dial table nests past the applicator head.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
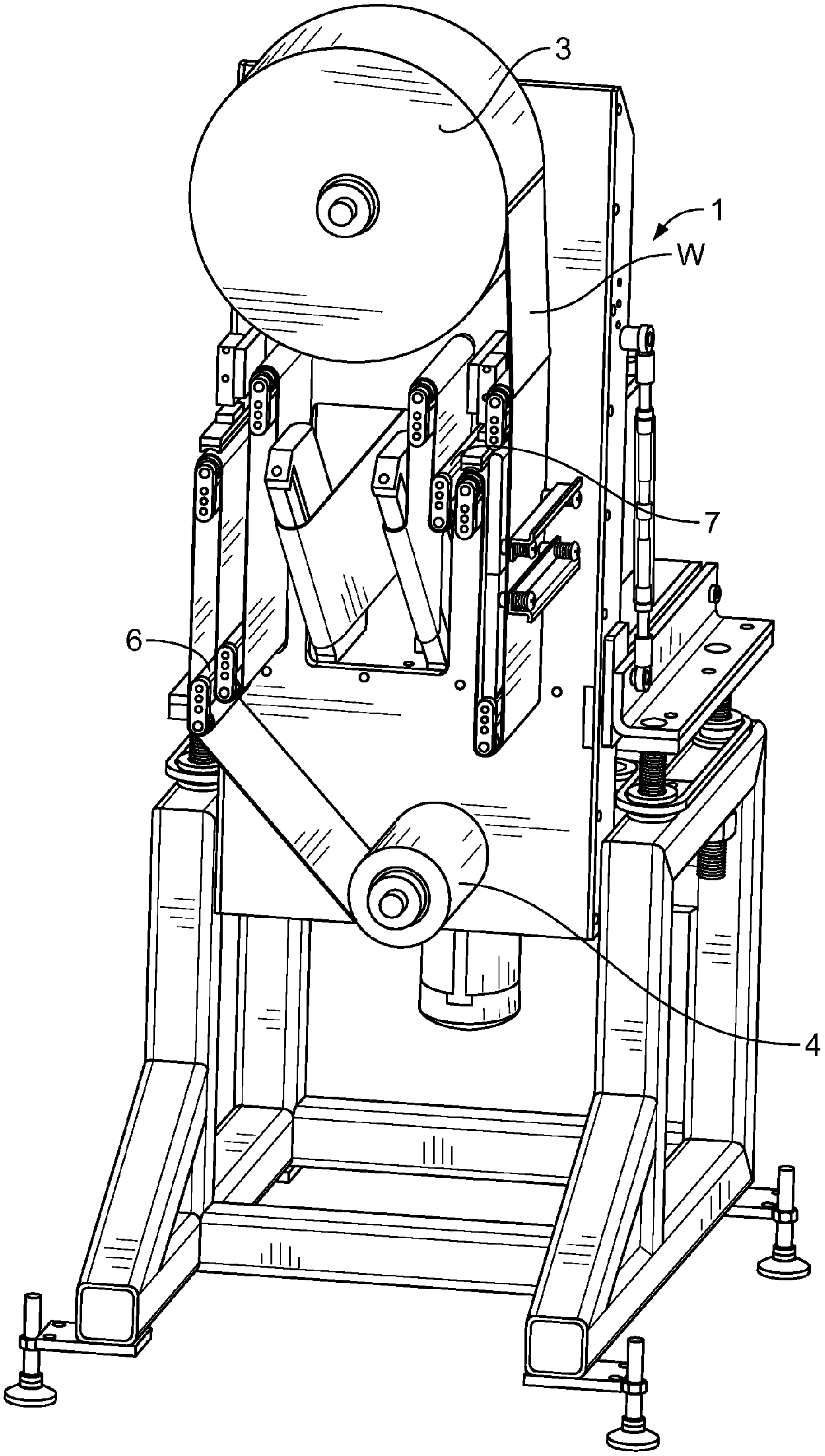
FIG. 1 is a front perspective illustration of a web/label transport assembly of a rotary decorating system embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 2:
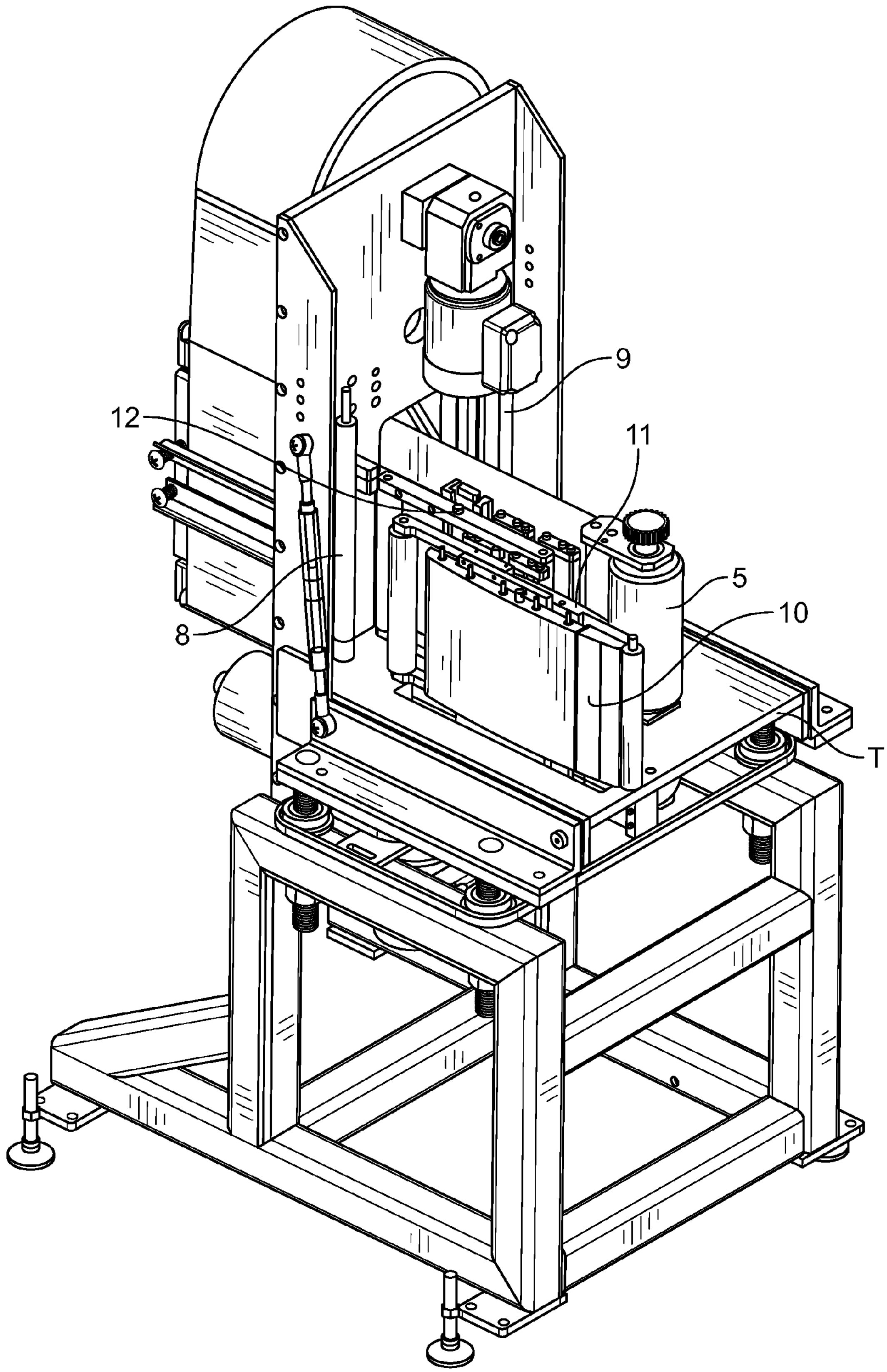
FIG. 2 is a rear perspective view of the web transport system.

Referring now to the figures and in particular, to FIGS. 1 and 2, there is shown a web/label transport assembly 1 for a rotary decorating system 2 (see FIG. 4) embodying the principles of the present invention. The web W is advanced by three major components, the pay-out drive 3, take-up drive 4, and the (rubber) web feed roller servo 5. The rubber web feed roller is electronically geared to the speed of the containers C to match web speed to the container's circumference. The ratios are calculated based on user input data. The pay-out and take-up drives run on demand based on the dancer rollers' 6, 7 position. The dancer arms provide position feedback by means of an analog transducer.

The dancer arms are gravity weighted linear slides with an attached idler roller to provide tension to the web at the pay-out and take-up roll ends. The position of the dancer arms is monitored by a scaled analog signal transmitted from a transducers 8, 9, respectively connected to the slides.

Figure 5:
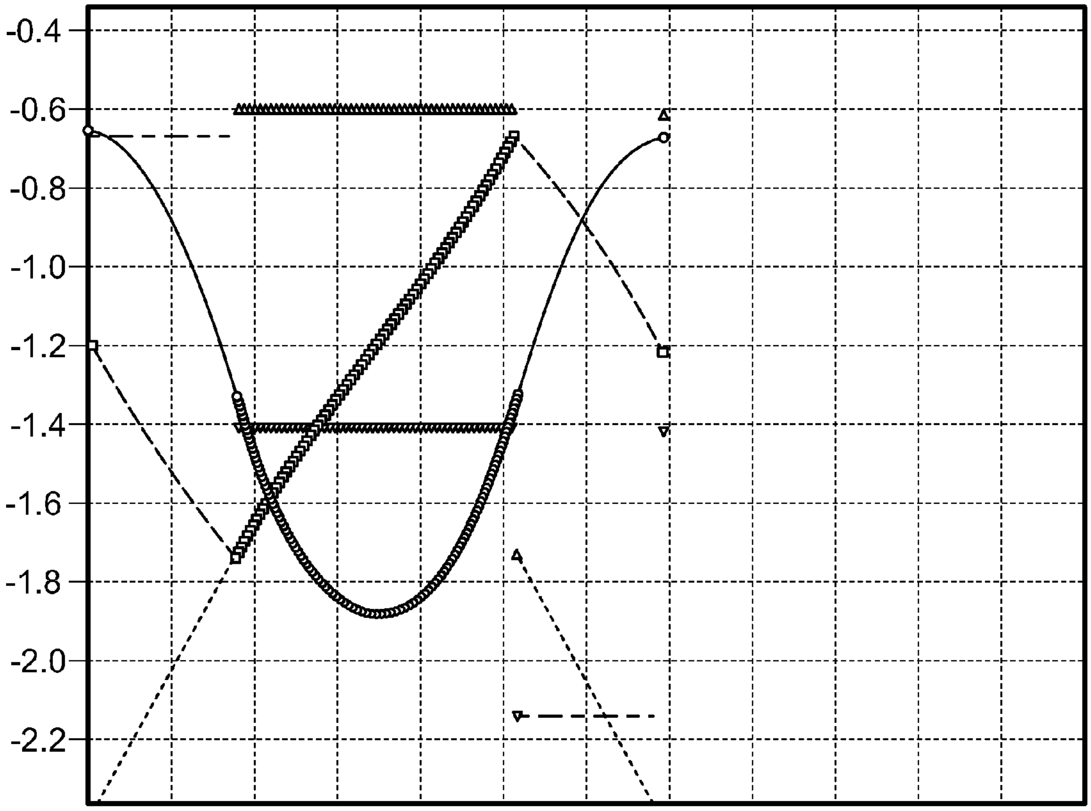
FIG. 5 is a sample contour plot for a circular cross-section bottle.

Each new container that needs decoration will have the surface contact points calculated. These calculations are based on the dimensions of the container which are provided by an operator. The applicator head 10 tangent position points become a mathematically configured electronic cam followed by the servo driving the applicator head. Container movement is electronically synchronized to the applicator head's electronic cam. A sample contour is plot, which is not to scale, is illustrated in FIG. 5.

The contour plot is used as an electronic cam that is followed by the decorating head. This cam profile is repeated once per product repeat pitch. The cam profile can be offset by the servo stroke to adjust the application pressure or head stroke. The servo used for this motion is a rotary servo driving a ball screw to produce the decorating head motion. This produces a high precision response to accurately follow the container contour or cam profile (as described by the contour plot).

The web is pulled across the heated applicator head roller at a speed that matches container movement during application. Between applications of labels, web speed increases or decreases to accurately position the next label (decal) and to correct for the difference between the timing of the container spacing and the pitch of the labels on the web. Immediately after the label is released from the web, the web is cooled as it passes over a plate 11 cooled by an internal water jacket. This, chills the wax emulsion that was softened (heated) to release the label from the web.

The geometry of the web path around the servo positioned idler rollers 12 before the decorating head is symmetrical to the path around the idler rollers connected to the same actuator after the decorating head. This provides for linear web movement in relationship to the servo axis travel.

For example, if the web is held taught between the pay-out and take-up spools, moving the web idler servo axis 12 one inch back (or away) from the container (not, shown, but back or away from the end of the table T) will advance the web two inches from its start position. With the web held taught, moving the applicator head servo axis 10 forward one inch backs up the web two inches from the start position. Using this web path approach and electronically gearing servo axis 10 to servo axis 12 in a direct ratio compensates for error in label position as the applicator head follows the bottle contour applying the label.

In addition to the electronic gear ratio to axis 10, the servo web idler axis 12 performs a cam profile once per product pitch to compensate for the difference between product pitch and label web pitch. For example, if the product has a pitch of six inches and is moving at the rate of 1 per second, the product rate is 360 inches per minute. The label are also applied once per second but the pitch between labels on the web is five inches so the linear web speed is 300 inches per minute. The servo web idler 12 cam profile matches the web speed to the product speed during the time the applicator head is applying the label. Between application of labels, the cam profile positions the idler rollers back to the correct position to align the next label. By mathematically changing the slope of this cam profile, the web can run at a rate slightly faster/slower than the product rate thereby controlling "label stretch" during application.

Figure 3:
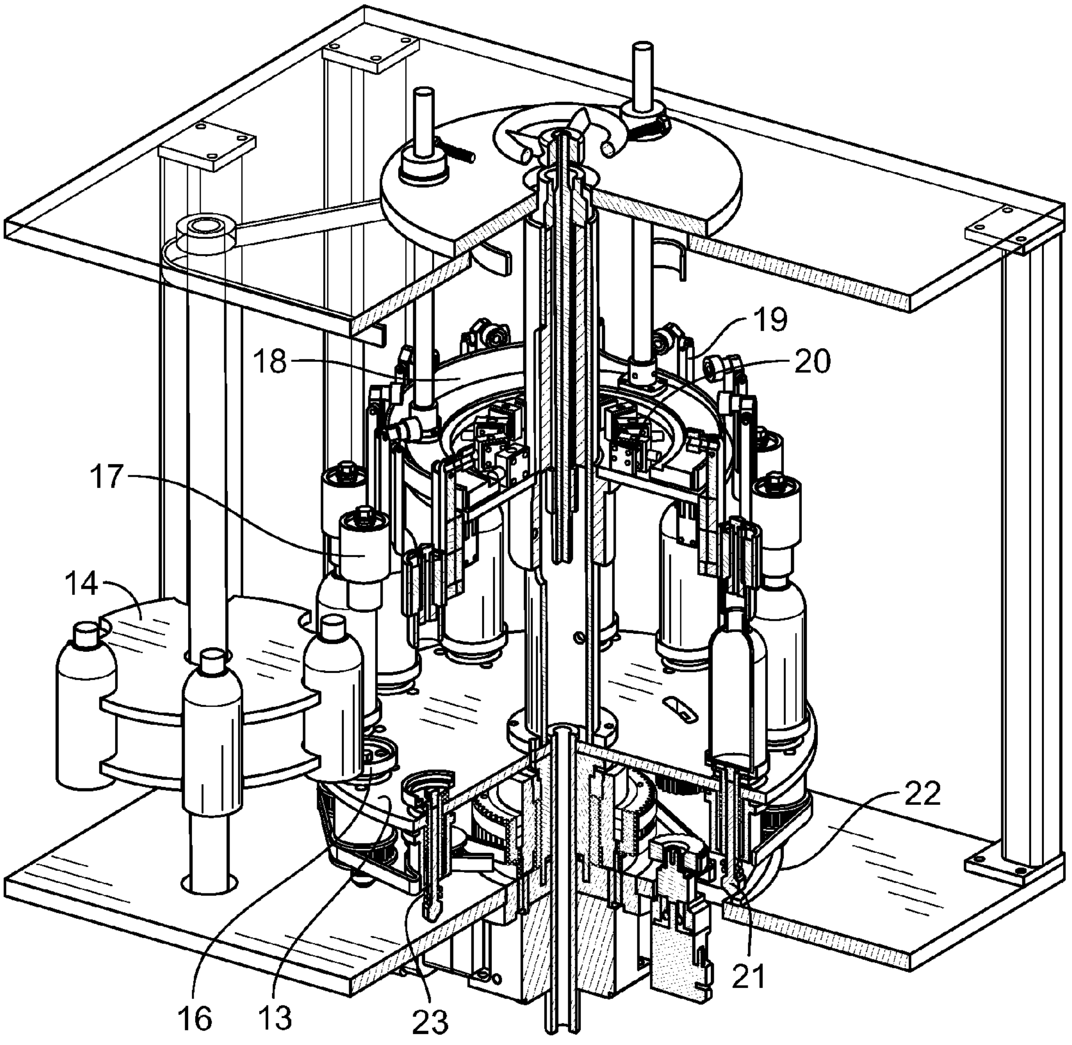
FIG. 3 is a perspective view of the container transport-inflate-index dial table.
Figure 4:
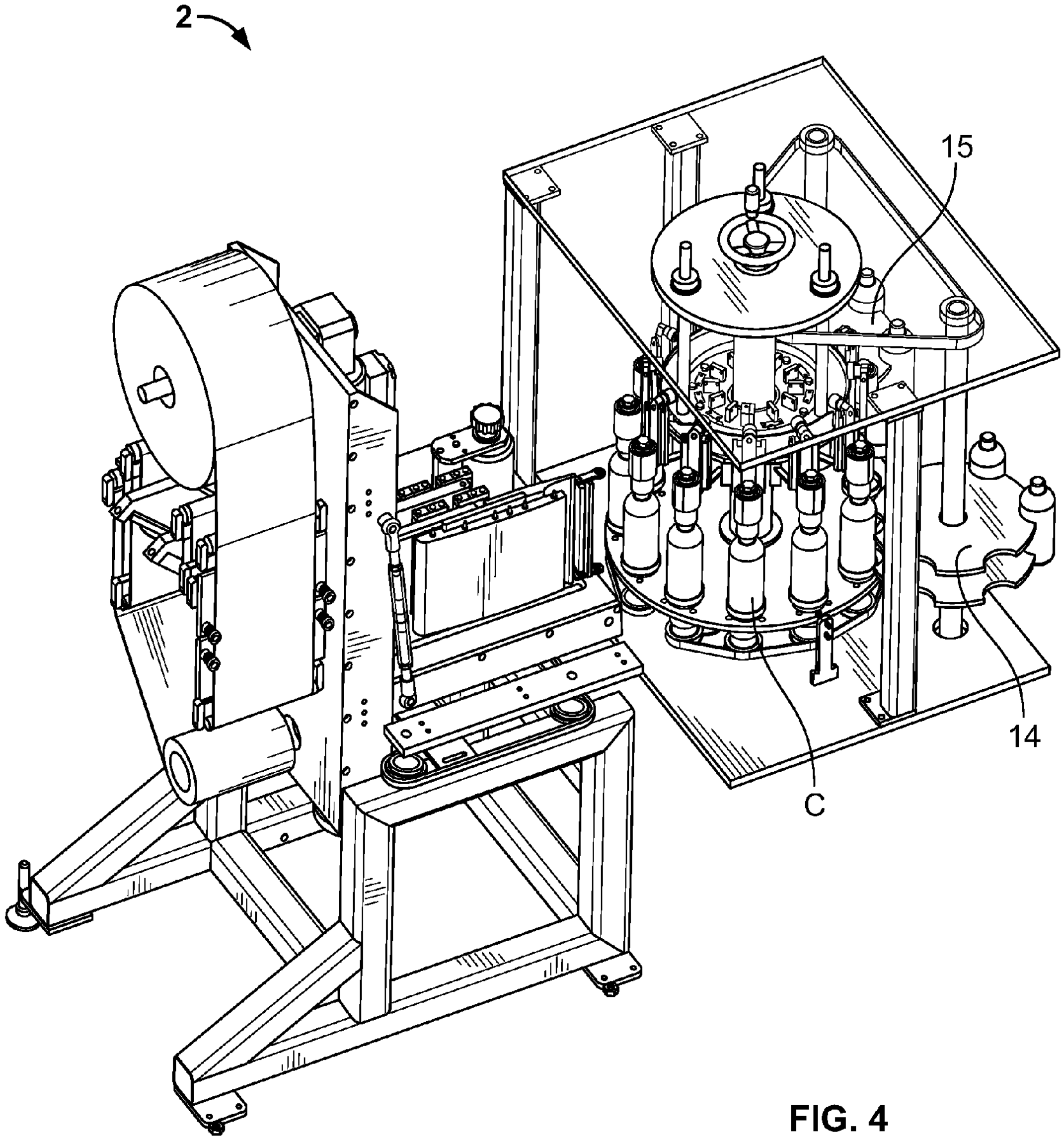
FIG. 4 perspective view illustration showing the web/label transport assembly and the container transport-inflate-index dial table in an operating mode.

Referring to FIGS. 3 and 4, containers C are fed onto a station dial table 13 by means of star wheels 14, 15 driven by the same servo that rotates the dial table. As the dial table rotates, the container is seated in the nest 16 and is captured by the upper inflate nozzle assembly 17. This assembly is cam 18 driven away from the container for unloading and closed by means of dual springs 19 that provide adjustment for variations in container C height. The present table 13 is a twelve station table, however, it will be appreciated that any number of stations can be present on the table, and that such a modification is within the scope and spirit of the present invention.

Once the container is captured between the top and bottom mechanisms a slight friction drag to the upper nozzle assemble spins the container in the lower nest until the molded orientation feature (not shown) of the container is driven by the matching pawl in the lower nest assembly. The container is then inflated by mechanically actuated air valves 20 timed to provide air before the container reaches the decorating head.

The container decoration begins when the dial table presents the container to the application roller at a tangent point of 45 degrees. The application roller follows the contour of the container as it indexes past the application head. The decoration is complete at a tangent point of 45 degrees on the trailing edge of the container.

All of the nests (twelve nests in the present table) on the rotary dial table are rotated by a common servo independent of the servo used to rotate the dial table. The speed of the nest rotation is electronically geared and timed such to rotate the container 360 degrees during the time of contact with the application roller. (Tangent contact 45 degrees before and after the container moves past the applicator head)

Container unload is performed by a plunger 21 located in the center of each nest on the dial table that moves up through the center of the nest. Each nest will release the container by lifting the part up as the plunger is cam 22 driven to move up. The plunger returns down after part release by means of a spring 23. At the same time the upper inflate nozzle is cam driven away from the container. The released container is moved away from the dial table by a similar set of star wheels 15 as was used in part loading. The second set of star wheels are also driven by the common servo rotating the dial table.

The present system provides a number of novel feature unknown in present rotary label applicator systems. For example, the present system provides flexible parameter driven decorating profile based on container dimensions and machine configuration. Mechanical cams and gears that otherwise need adjustment for specific decoration settings are eliminated. In addition, the present system provides a servo driven six or twelve station dial table with nests that rotate containers at an adjustable speed to control label stretch during application.

The present system also achieves faster production rates by decorating containers on the fly as they pass the application roller, rather than an indexed or stopper applicator station. Flexible and minimal tooling change parts accommodate larger diameter containers by only populating six of the twelve nests.

In addition, the present system also provides a quick splice platform that incorporates easy release web clamps and knife guides for accurate roll change splicing.

These novel features provide numerous advantages over known systems, including decorating process parameters that are adjustable on the fly without stopping production. In addition, multiple jobs can are stored in controller (not shown) software for quick changeover with tooling sets. And, importantly, the present system is configured with a small floor footprint that is achieved by using a vertical web pay-out and take-up system.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the invention.

What is claimed is:

1. A method for transferring a label from a web having a plurality of labels to a selected one of an item of a group of items moving on a rotary transport along a path, comprising the steps of:

circumferentially advancing the item toward the web;

rotating the item as it approaches the web;

advancing the web through a label applicator system, the label applicator system including a supply reel for supplying the web with the labels thereon, a take-up reel for taking up the web after transfer of the label from the web to the item, the supply and take-up reels being vertically oriented, the supply reel and the take-up reel supplying and taking-up the web in a vertical direction, the label applicator system including a movable label applicator head, a rotary table for moving the items along a path defined by rotation of the table and for rotating the items relative to an axis of the items, a biased dancer arm associated with each the supply reel and the take-up reel, the dancer arms configured to move linearly and parallel to one another, a transducer operably connected to each of the dancer arms and a control system, the label applicator head being movable toward and away from the item, and a web positioning assembly for advancing and retracting the web to accommodate a pitch difference between the items in the item transport and the labels on the web, and retracting the web to accommodate the pitch difference between the items in the item transport and the labels on the web;

reorienting the web from the vertical direction to a horizontal direction;

positioning the web to accommodate a difference in pitch of adjacent labels and a pitch of adjacent items to approximately match a speed of advancing the item to a speed of advancing the web;

maintaining tension in the web as the web moves through the applicator system;

monitoring a position of a respective dancer arms; and transferring the label from the web to the item as the web is moving in the horizontal direction.

2. A label applicator system for transferring labels from a web to items moving on a rotary item transport, comprising:

a supply reel for supplying the web with the labels thereon;

a take-up reel for taking up the web after transfer of the label from the web to the item, the supply and take-up reels being vertically oriented, the supply reel and take-up reel supplying and taking up the web in a vertical direction;

a movable label applicator head;

a rotary table for moving the items along a path defined by rotation of the table and for rotating the items relative to an axis of the items;

a biased dancer arm associated with each the supply reel and the take-up reel, the dancer arms configured to move linearly and parallel to one another;

a transducer operably connected to each of the dancer arms; and a control system, wherein the web is reoriented to move in a horizontal direction and wherein the label applicator head is movable toward and away from the item and wherein the item is rotated to apply the label to the item, with the web moving in the horizontal direction, as it moves past the applicator head, and including a web positioning assembly configured to advance and retract the web to accommodate a pitch difference between the items in the item transport and the labels on the web, wherein the dancer arms maintain tension in the web as the web moves through the applicator system, and wherein the transducers monitor a position of a respective dancer arm.

3. The label applicator system in accordance with claim 1 wherein at least one of the supply and take-up are servo-driven.

4. The label applicator system in accordance with claim 1 including an inflation system for inflating the item prior to transferring the label from the web to the item.

* * * * *